US012702130B2

(12) United States Patent
Park et al.

(10) Patent No.: US 12,702,130 B2
(45) Date of Patent: Aug. 11, 2026

(54) CELL CRYOPRESERVATION DEVICE

(71) Applicant: CEFO Co., Ltd., Seoul (KR)

(72) Inventors: Hyun Sook Park, Seoul (KR); Sunray Lee, Seoul (KR)

(73) Assignee: CEFO Co., Ltd., Seoul (KR)

( * ) Notice: Subject to any disclaimer, the term of this patent is extended or adjusted under 35 U.S.C. 154(b) by 798 days.

(21) Appl. No.: 18/011,133

(22) PCT Filed: Jun. 14, 2021

(86) PCT No.: PCT/KR2021/007391
§ 371 (c)(1),
(2) Date: Dec. 16, 2022

(87) PCT Pub. No.: WO2021/256801
PCT Pub. Date: Dec. 23, 2021

(65) Prior Publication Data

US 2023/0172190 A1 Jun. 8, 2023

(30) Foreign Application Priority Data

Jun. 19, 2020 (KR) ........................ 10-2020-0074697
Jun. 11, 2021 (KR) ........................ 10-2021-0076299

(51) Int. Cl.
*A01N 1/144* (2025.01)
*B01L 3/00* (2006.01)

(52) U.S. Cl.
CPC .......... *A01N 1/144* (2025.01); *B01L 3/50853* (2013.01); *B01L 3/50857* (2013.01)

(58) Field of Classification Search
CPC ..... A01N 1/144; A01N 1/147; B01L 3/50853; B01L 3/50857; B01L 3/5082;
(Continued)

(56) References Cited

U.S. PATENT DOCUMENTS 10,494,601 B2 12/2019 Park et al.
2009/0321451 A1 12/2009 Byrne et al.
(Continued)

FOREIGN PATENT DOCUMENTS

CN 205658254 10/2016
CN 205658254 U * 10/2016
(Continued)

OTHER PUBLICATIONS

Garg et al., "Prospective Review of Mesenchymal Stem Cells Differentiation into Osteoblasts," Orthopaedic Surgery (2017) 9:13-19.
(Continued)

*Primary Examiner* — John McGuirk
(74) *Attorney, Agent, or Firm* — MORRISON & FOERSTER LLP

(57) ABSTRACT

The present invention relates to a cell cryopreservation device, and can comprise: a first housing for accommodating a plurality of test tubes; a second housing for covering the first housing; center support ribs extended upward from the inner bottom surface of the first housing to come in contact with and support the side surfaces of the surrounding test tubes; and side support ribs extended from the inner wall surface of the first housing toward the inner side of the first housing to come in contact with and support the side surfaces of the test tubes.

13 Claims, 16 Drawing Sheets

(58) Field of Classification Search
CPC ....... B01L 2200/025; B01L 2300/0858; B01L 9/06; B65D 25/04; B65D 51/1611
See application file for complete search history.

(56) References Cited

U.S. PATENT DOCUMENTS

| | | | |
|---|---|---|---|
| 2013/0156724 | A1 | 6/2013 | Lorenzo et al. |
| 2014/0206022 | A1 | 7/2014 | Nuti et al. |
| 2018/0306493 | A1 | 10/2018 | James |
| 2023/0172190 | A1 | 6/2023 | Park et al. |

FOREIGN PATENT DOCUMENTS

| | | |
|---|---|---|
| CN | 107751184 | 3/2018 |
| CN | 207208840 | 4/2018 |
| CN | 110577929 | 12/2019 |
| JP | 2008-297220 | 12/2008 |
| JP | 2009-256350 | 11/2009 |
| KR | 20-2009-0011443 | 5/2009 |
| KR | 10-2009-0076483 | 7/2009 |
| KR | 10-2013-0087952 | 8/2013 |
| KR | 10-2016-0034541 | 3/2016 |
| KR | 10-2017-0045023 | 4/2017 |
| KR | 10-2018-0087870 | 8/2018 |
| KR | 10-2019-0037504 | 4/2019 |
| KR | 10-2064088 | 1/2020 |
| KR | 10-2090100 | 3/2020 |
| KR | 10-2021-0134429 | 10/2021 |
| WO | WO 2019/027873 | 2/2019 |
| WO | WO 2020/064791 | 4/2020 |

OTHER PUBLICATIONS

U.S. Appl. No. 17/918,093, filed Dec. 10, 2022, by Park et al.

* cited by examiner

Φ 6㎜/1836.9 ㎟

| [model 1-1] Ø6 mm/706.5 mm² | [model 1-2] Ø6 mm/1,836.9 mm² | [model 1-3] Ø=12 mm/2,826 mm² | [model 1-4] Ø=15 mm/4,415 mm² |
| --- | --- | --- | --- |
| Hole Rib | | | |

FIG. 13

| model no. | Maximum total heat flux (W/m²) | model no. | Maximum total heat flux (W/m²) |
|---|---|---|---|
| model 1-1 | 7,099.7 | model 2-1 | 7,024.5 |
| model 1-2 | 7,102.5 | model 2-2 | 8,072.1 |
| model 1-3 | 6,347.9 | model 2-3 | 7,849.2 |
| model 1-4 | 6,626.2 | model 2-4 | 7,055.1 |

FIG. 15

CELL CRYOPRESERVATION DEVICE

CROSS REFERENCE TO RELATED APPLICATIONS

This application is a national stage application under 35 U.S.C. § 371 of International Application No. PCT/KR2021/007391, filed internationally on Jun. 14, 2021, which claims priority to and the benefit of Korean Patent Application No. 10-2020-0074697, filed on Jun. 19, 2020, and Korean Patent Application No. 10-2021-0076299, filed on Jun. 11, 2021, the disclosures of which are incorporated herein by reference in their entireties.

TECHNICAL FIELD

The present invention relates to a cell cryopreservation device, and more particularly, to a cell cryopreservation device having an improved structure which is advantageous for rapidly reaching temperature equilibrium.

BACKGROUND ART

This patent application has been filed with the support by the Korean Fund for Regenerative Medicine (KFRM) grant funded by the Korea government (the Ministry of Science and ICT, the Ministry of Health & Welfare).

[Project ID Number] 22D0801L1

[Project Number] 22D0801L1

[Department Name] the Korea government (the Ministry of Science and ICT, the Ministry of Health & Welfare)

[Project Management (Professional) Organization Name] the Korean Fund for Regenerative Medicine (KFRM)

[Research Program Name] Korea governmental regenerative medical technology development project

[Research Project Name] Phase 1 Clinical Trial to Evaluate the Safety and Exploratory Efficacy of Osteoblast based Cell Therapy CF-M801 derived from Human Umbilical Cord in Patients with Osteonecrosis of the Femoral Head.

[Contribution Ration] 50/100

[Project Execution Organization Name] CEFO Co., Ltd.

[Study Period] 2022.04.01~2024.12.31

This patent application has been filed with the support by the Korean Fund for Regenerative Medicine (KFRM) grant funded by the Korea government (the Ministry of Science and ICT, the Ministry of Health & Welfare).

[Project ID Number] 22C0604L1

[Project Number] 22C0604L1

[Department Name] the Korea government (the Ministry of Science and ICT, the Ministry of Health & Welfare)

[Project Management (Professional) Organization Name] the Korean Fund for Regenerative Medicine (KFRM)

[Research Program Name] Korea governmental regenerative medical technology development project

[Research Project Name] Development of advanced bio-convergence medical product based on umbilical cord-derived osteoblasts for the treatment of osteoporotic fractures

[Contribution Ration] 50/100

[Project Execution Organization Name] CEFO Co., Ltd.

[Study Period] 2022.04.01~2025.12.31

The development and commercialization of cell-based therapeutic agents have been actively made recently. Therapeutic agents should be cryopreserved for at least a month up to six months until they are on the market after their production. In this case, the cells may be stored for a long time by stopping their metabolism at an ultra-low temperature through cryopreservation.

Several studies identified that the proliferation rate of cells increases when the temperature at which the cells are stored is lower, especially when cells are stored at a temperature lower than −130° C., which is the glass transition temperature of water.

Therefore, all industry-university-institute collaborations have adopted a method of storing cells by introducing a cryopreservation solution, which generally contains a cryoprotectant such as dimethyl sulfoxide (DMSO) for freezing and cryopreservation of the cells, together with the cells to be stored, into vials and placing a storage container including the vials in a liquid nitrogen tank However, because it has a drawback that cells are highly likely to be cross-contaminated due to the flow of liquid nitrogen, there are an increasing number of cases in which a vial-containing storage container into which cells are injected is not applied to a liquid nitrogen tank but applied to a system (hereinafter referred to as "vapor-type tank") maintained at a cryogenic temperature of −180° C. through the convective circulation of gaseous nitrogen by developed countries.

Storage containers used for conventional liquid nitrogen tanks have a structure in which liquid nitrogen through holes are minimized to prevent mechanical damage to cells in direct contact with liquid nitrogen under cryogenic environments, but have a drawback that it is impossible to quickly drop the temperature of the cells in the vials by allowing gaseous nitrogen having lower thermal conductivity than liquid nitrogen to flow therein.

On the other hand, when the area of the through holes is excessively widened to ensure the rapid flow of gaseous nitrogen in the storage container, mechanical damage to the storage container may be caused due to the shrinkage stress during cooling, thereby making it impossible to store the cells safely.

Korea Utility Patent Publication No. 20-2009-0011443 discloses a container box for cryopreservation of cryovials.

A conventional cell cryopreservation device has a structure in which a lower container box (a body) and an upper container box (a cover) generally form one accommodation space as known in the art, wherein a grid structure may be integrally formed in the lower container box, or separately manufactured and accommodated in the lower container box to separately dispose a plurality of test tubes.

However, the use of such a conventional cell cryopreservation device may cause the following problems.

In order to ensure the cell storage effect, first, when a cell cryopreservation device having test tubes accommodated therein is stored in liquid nitrogen, the test tubes accommodated in the cell cryopreservation device should suddenly drop to the temperature of liquid nitrogen to rapidly reach temperature equilibrium. However, the conventional cell cryopreservation device has a problem that such a storage effect may be hindered.

Also, when the cell cryopreservation device is taken out of the liquid nitrogen, the liquid nitrogen absorbed into the inside of the cell cryopreservation device or the test tubes may be suddenly expanded at room temperature so that the upper container box may be separated or the test tubes may explode. Therefore, it is necessary to rapidly remove liquid nitrogen in the cryopreservation device in terms of user safety.

DISCLOSURE

Technical Problem

The present invention is designed to solve the problems of the related art, and thus it is an object of the present invention to provide a cryopreservation device capable of maximizing the flow of gas and liquid through the through holes of a cryopreservation device to rapidly reach temperature equilibrium and sufficiently maintain mechanical strength.

That is, the object of the present invention is to provide a cell cryopreservation device capable of maximizing the flow of liquid or vaporized nitrogen, which is maintained at a temperature of −190° C. or lower in the cryopreservation device when cells in the test tubes are stored in a nitrogen tank, to rapidly reach temperature equilibrium in the cryopreservation device and prevent damage to the test tube or cell cryopreservation device itself.

Technical Solution

To solve the above problems, a cell cryopreservation device of the present invention may include a first housing for accommodating a plurality of test tubes, a second housing for covering the first housing, a central support rib extending upward from an inner bottom surface of the first housing to support the peripheral of the test tubes while coming in contact with side surfaces of the test tubes, and first bottom through holes formed in the centers of locations at which the test tubes are accommodated on a bottom surface of the first housing.

According to one embodiment of the present invention, the cell cryopreservation device of the present invention may further include second bottom through holes disposed between the first bottom through holes.

According to one embodiment of the present invention, the cell cryopreservation device of the present invention may further include side support ribs extending from an inner wall surface of the first housing toward the inner side of the first housing to support the test tubes while coming in contact with the side surfaces of the test tubes.

According to one embodiment of the present invention, each of the side support ribs may include a protrusion having one end fixed to an inner wall surface of the first housing and protruding in a direction perpendicular to the inner wall surface or in a direction diagonal to each corner, that is, a direction at an angle of 45°, and a contact portion protruding from a protruding end of the protrusion in both directions perpendicular to the protrusion.

According to one embodiment of the present invention, the first bottom through holes and the second bottom through holes may have a diameter of 3 to 6 mm.

According to one embodiment of the present invention, the cell cryopreservation device of the present invention may further include through holes vertically passing through the centers of the central support ribs.

According to one embodiment of the present invention, the diameter of the through holes may be in a range of 1.5 to 3 mm, which is a size that has no risk of mechanical damage, and, more accurately, may be 3 mm, which is a size favorable for air flow.

According to one embodiment of the present invention, each of the central support ribs may include a shaft portion extending upward from the bottom surface of the first housing, protrusions protruding in all four directions to be perpendicular to the side surface of the shaft portion, and contact portions protruding from ends of the protrusions in both directions perpendicular to a plane of the protrusion.

According to one embodiment of the present invention, the test tubes may be fixed in a state in which the side surfaces of upper and lower portions of the test tubes come into contact with the central support ribs or the side support ribs.

According to one embodiment of the present invention, each of the test tubes may include a test tube body made of a transparent material, a lower ring fitted onto a lower portion of the test tube body and having a larger diameter than the test tube body, and an upper cover coupled to an upper portion of the test tube body and having a larger diameter than the test tube body.

According to one embodiment of the present invention, the second housing may have first top through holes formed in a top surface thereof, and the first top through holes may be disposed above the first and second bottom through holes of the first housing.

According to one embodiment of the present invention, the diameter of the first top through holes may be in a range of 1.5 to 6 mm, which is a size that has no risk of mechanical damage, precisely in a range of 3 to 6 mm, which is a size favorable for air flow, and, more precisely, may be 6 mm, which is a size that has no risk of mechanical damage and is favorable for the flow and flow rate of air, thereby reaching rapid temperature equilibrium.

According to one embodiment of the present invention, the second housing may further include second top through holes formed in parallel with each of four edges of the top surface at a position adjacent to each edge.

According to one embodiment of the present invention, the second housing may further include a pair of third top through holes disposed in pairs with each of the second top through holes being interposed therebetween, wherein the third top through holes may be positioned to reach portions of the top and side surfaces.

Advantageous Effects

The present invention has an effect of providing a cell cryopreservation device which is favorable for reaching rapid temperature equilibrium of a liquid-type tank as well as a vapor-type tank by performing flow analysis of the flow of nitrogen gas in the storage container at a cryogenic steady state.

Also, the present invention has an effect of preventing damage to cells when test tubes into which the cells are accommodated are taken out by minimizing a contact portion of a housing with the test tubes.

In addition, the present invention has an effect of providing an arrangement of through holes through which the inflow and outflow of liquid nitrogen is easily made through fluid analysis, thereby rapidly cooling a cell culture solution in the test tubes and preventing the housing from being damaged due to the stress by cooling.

BRIEF DESCRIPTION OF PARTS IN THE DRAWINGS

| | | | |
|---|---|---|---|
| 100: | first housing | 110: | through hole |
| 120: | central support rib | 130: | side support rib |
| 200: | second housing | 210: | first top through hole |
| 220: | second top through hole | 230: | third top through hole |
| 300: | test tube | | |

FIG. 13 lists analysis models of 5×5 models according to the present invention.

Figure 14:
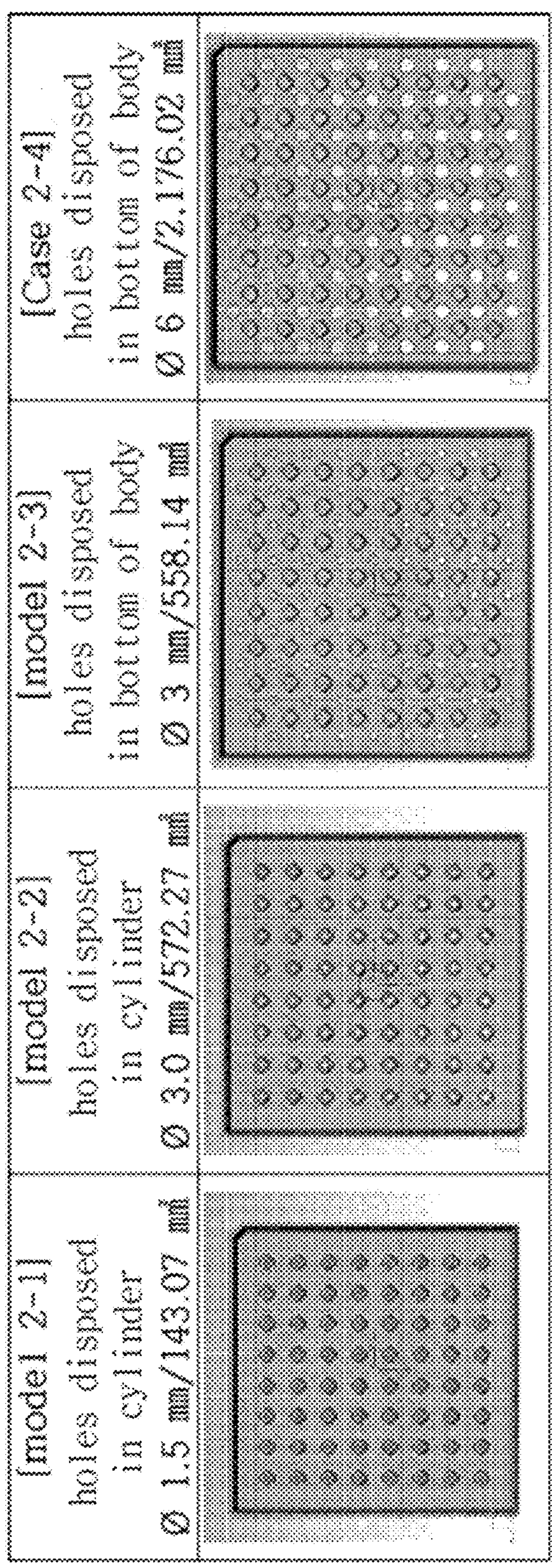

FIG. 14 lists the analysis models of 9×9 models described with reference to FIG. 5. The 9×9 models are named and described as "model 2," and divided into models having the through holes 124 and models having no first bottom through holes.

FIG. 15 shows thermal analysis results.

Figure 16A:
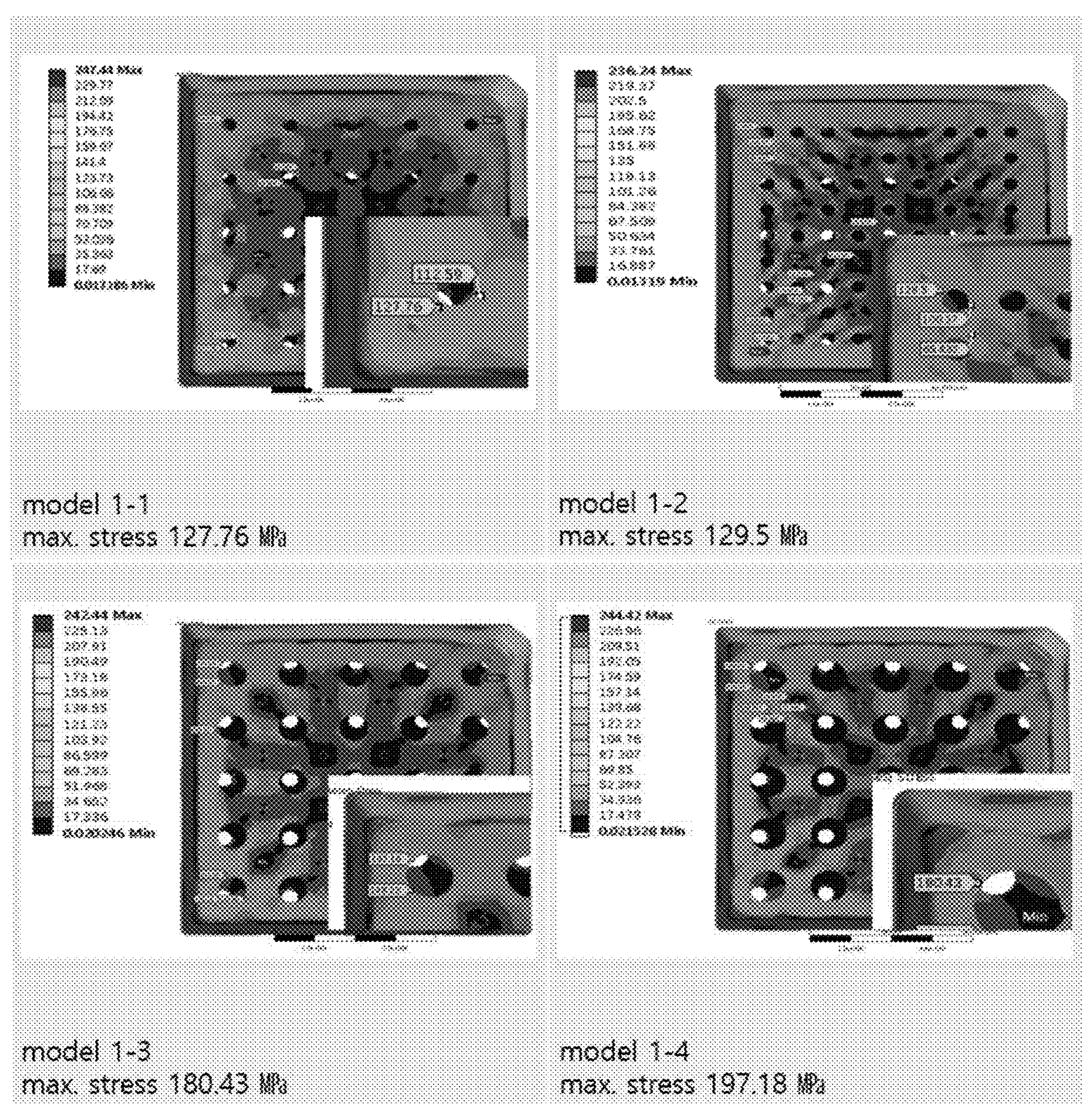
Figure 16B:
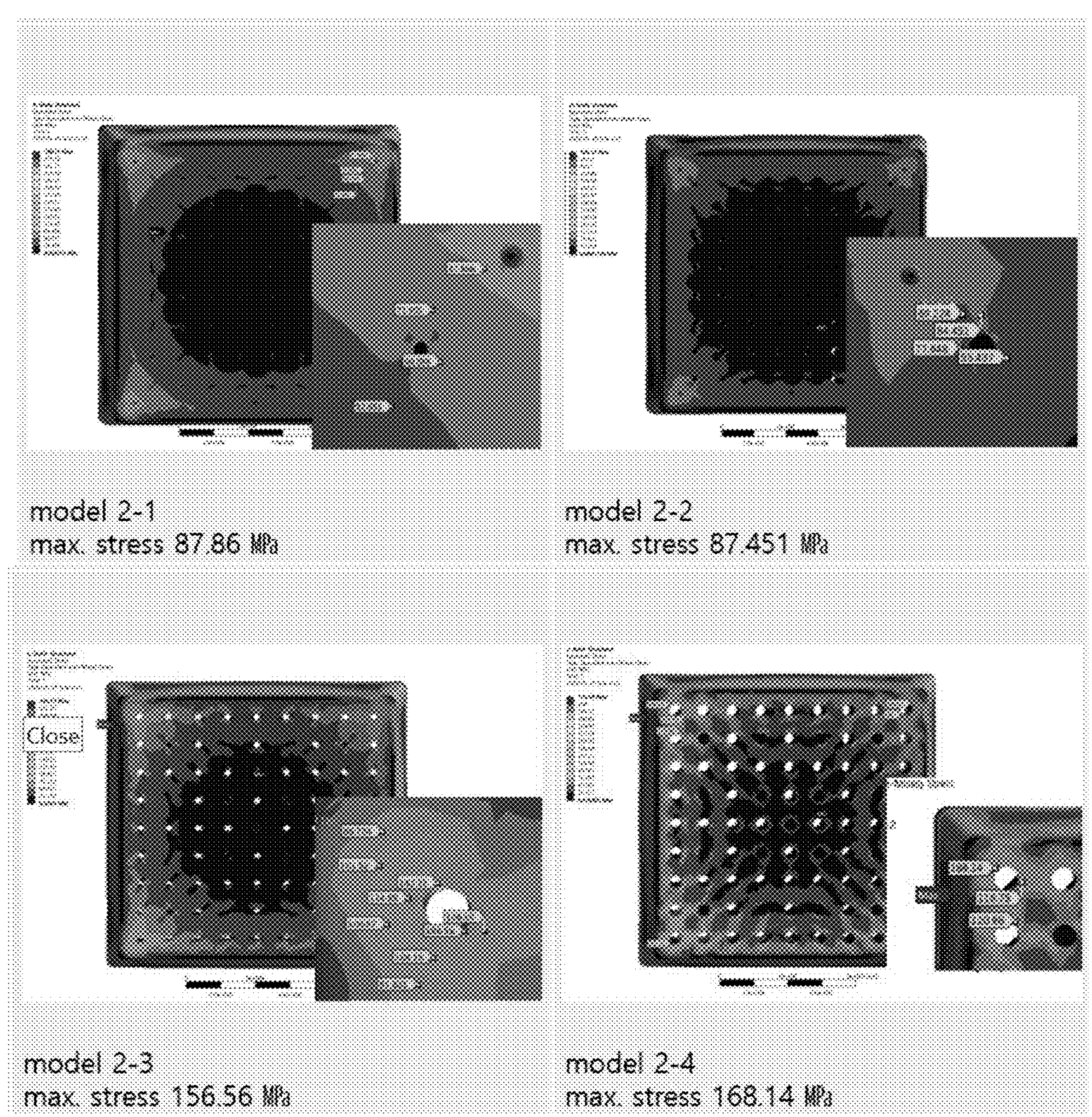

FIG. 16A-16B shows thermal-structural coupling analysis models.

Figure 17:
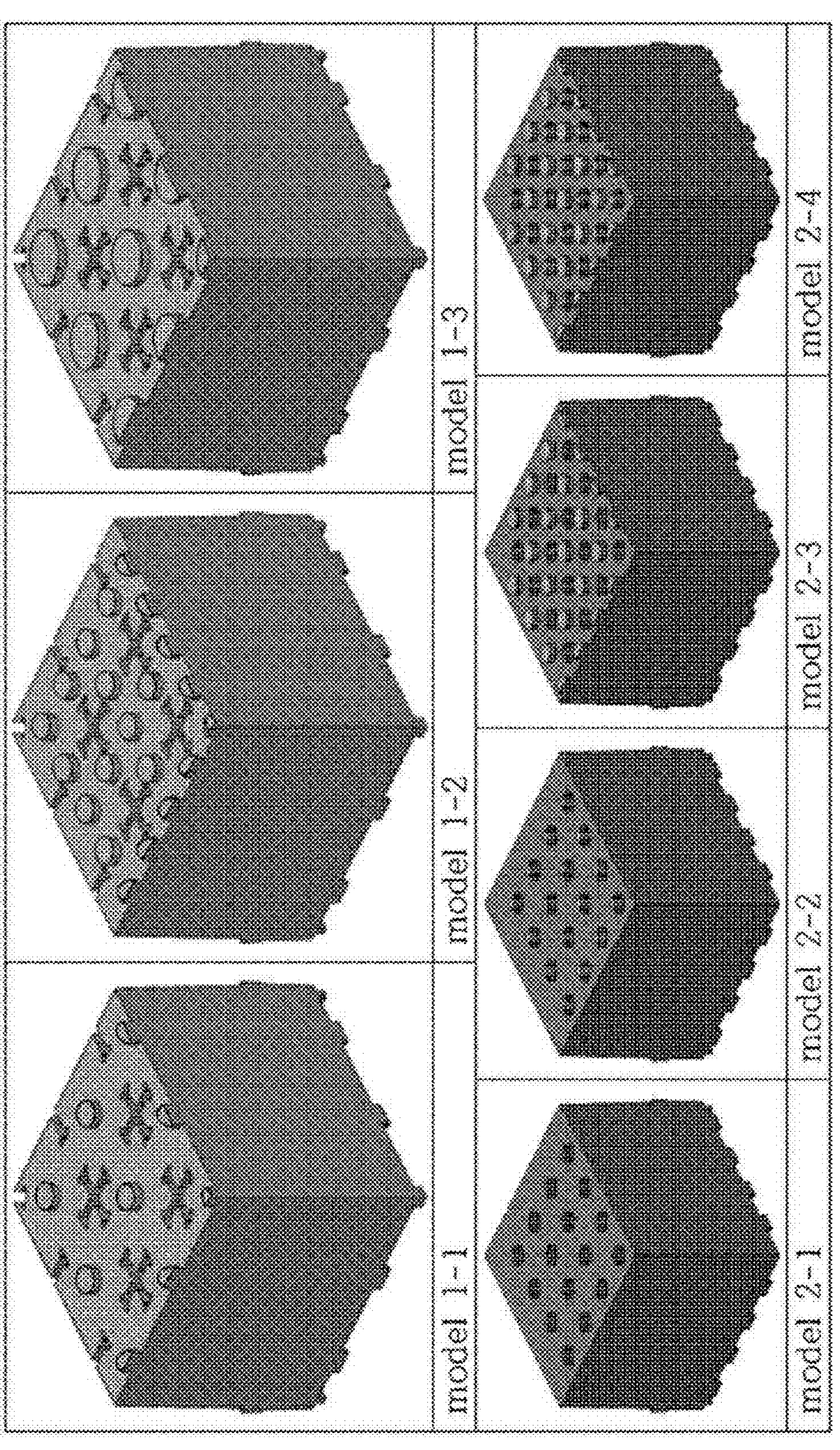

FIG. 17 lists an inlet-outlet configuration set for each of the 5×5 and 9×9 models.

BEST MODE

Hereinafter, preferred embodiments of the present invention will be described in detail with reference to the accompanying drawings.

Unless particularly defined otherwise, all terms used herein have the same meaning as commonly understood by one of ordinary skill in the related art and if they conflict with the meaning of the terms used herein, they follow the definitions used in the specification.

However, it should be understood that the invention disclosed hereinafter is given for the purpose of illustrating the present invention and not intended to limit the scope of the present invention. Through the specification, the same components used herein are given the same reference numerals.

Figure 1:
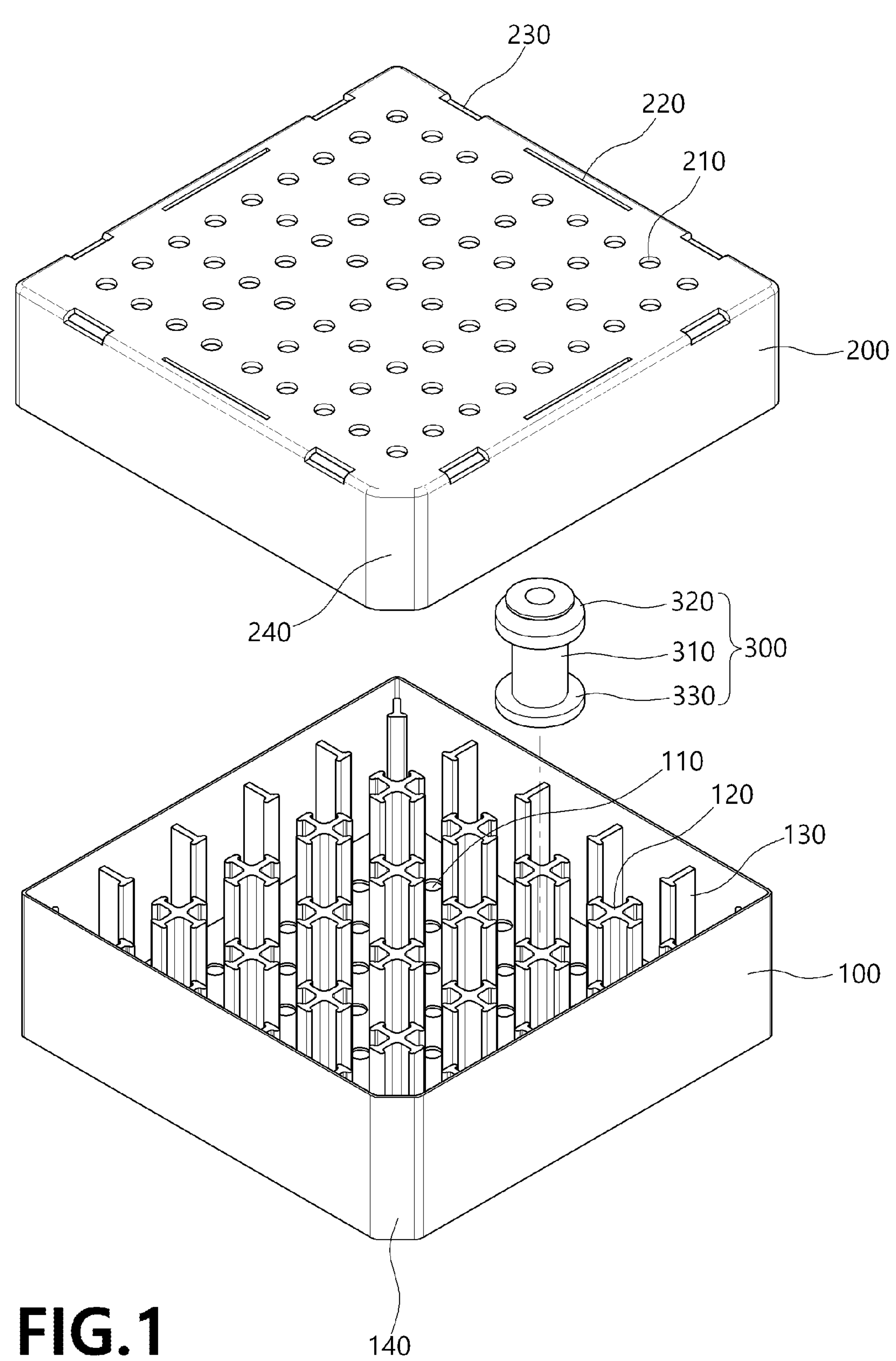
FIG. 1 is an exploded perspective view of a 5×5 cell cryopreservation device according to one preferred embodiment of the present invention.
Figure 2:
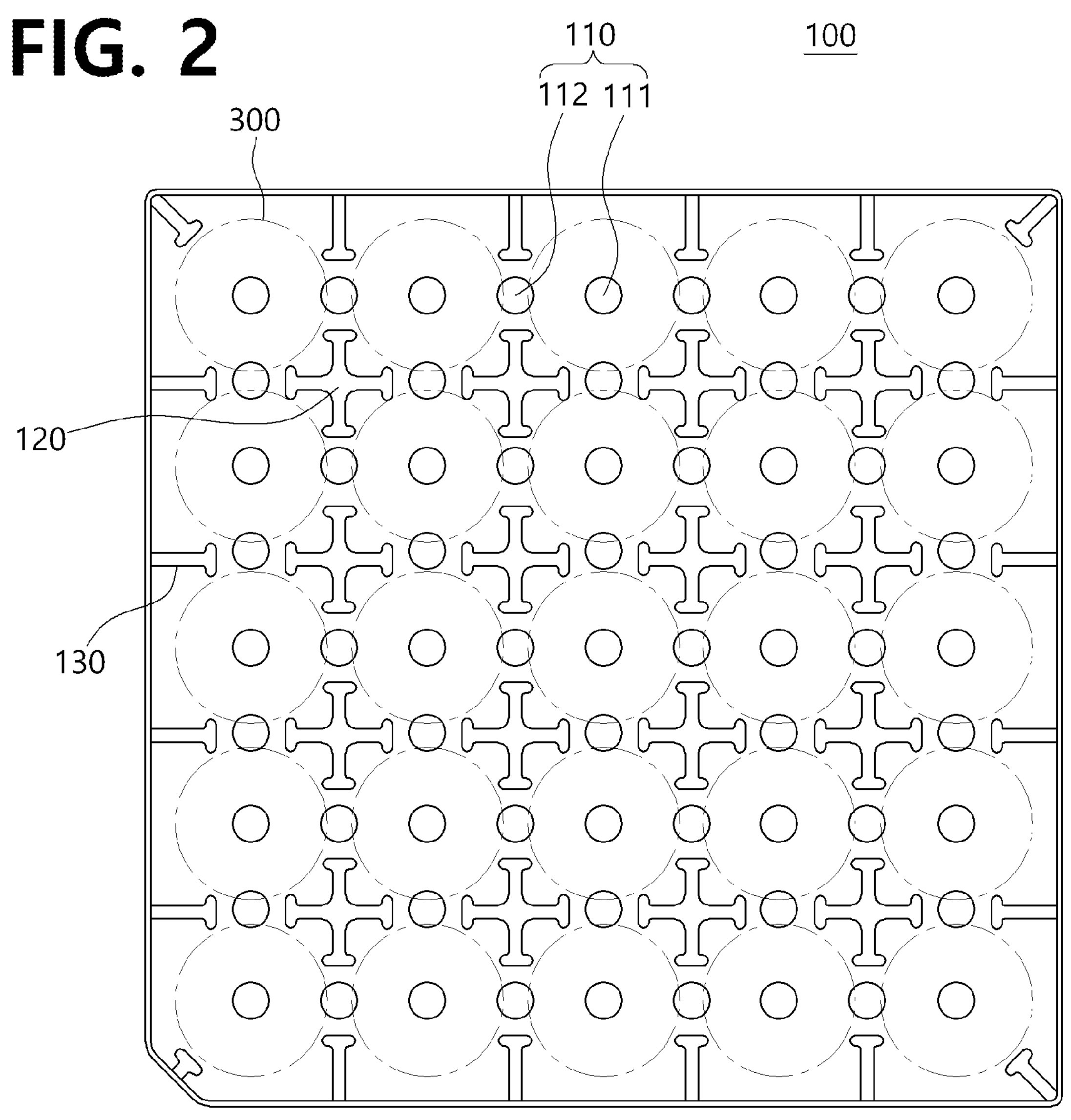
FIG. 2 is a top view of a first housing according to one embodiment of the present invention.

FIG. 1 is an exploded perspective view of a 5×5 cell cryopreservation device according to one preferred embodiment of the present invention, and FIG. 2 is a top schematic view of a first housing as shown in FIG. 1.

Referring to FIGS. 1 and 2, a cell cryopreservation device according to one embodiment of the present invention is configured to include a first housing 100 having a plurality of through holes 110 formed in the bottom surface thereof and including central support ribs 120 having open top surfaces and protruding upward from the bottom surface of the first housing, and side support ribs 130 protruding from an inner side surface of the first housing in a direction perpendicular to the side surface; test tubes 300 for accommodating cells and seated between the central support ribs 120 of the first housing 100 or between the central support ribs 120 and the side support ribs 130; and a second housing 200 for covering the top surface of the first housing 100, wherein the second housing 200 has a plurality of first top through holes 210 formed in the top surface thereof, and second top through holes 220 and third top through holes 230 provided at the boundary between the top surface and the side surfaces.

Hereinafter, the configuration and action of the cell cryopreservation device according to one preferred embodiment of the present invention thus configured will be described in further detail.

First, the first housing 100 has an open top surface and a hollow hexahedral structure, and may have a bent surface 140 formed at one of four corners to determine a coupling direction to the second housing 200.

That is, the first housing 100 and the second housing 200 are coupled so that the first housing 100 is inserted into the second housing 200. In this case, bent surfaces 140 and 240, which are flat surfaces, are formed respectively at corners of the first housing 100 and the second housing 200, and thus the two bent surfaces 140 and 240 are coupled in a matching direction.

The plurality of through holes 110 are disposed in the bottom surface of the first housing 100, and the central support ribs 120 protruding upward from the bottom surface of first housing 100 where no through holes 110 are formed are disposed.

The central support ribs 120 are integrally formed with the first housing 100.

Also, the side support ribs 130 are disposed on an inner side surface of the first housing 100 so that the side support ribs 130 protrude toward the central support ribs 120 in a direction perpendicular to the side surface of the first housing 100.

The central support ribs 120 and the side support ribs 130 serve to stably support the test tubes 300, and are configured to maximally prevent damage to the test tubes 300.

The central support ribs 120 include ribs protruding in all four directions, and the side support ribs 130 include ribs protruding in one direction. In this case, the test tubes 300 may be fixed by four central support ribs 120 in a state in which the side surfaces of the test tubes 300 come into contact with the four central support ribs 120, or may be fixed by two central support ribs 120 and two side support ribs 130 in a state in which the side surfaces of the test tubes 300 come into contact with the two central support ribs 120 and the two side support ribs 130.

In this case, the entire side surfaces the test tubes 300 do not come into contact with the central support ribs 120 or side support ribs 130, but some of the upper and lower portions of the test tubes 300 come into contact with the central support ribs 120 or side support ribs 130. Therefore, it is possible to prevent the test tubes 300 from being damaged when the test tubes 300 are taken out while the cells are in a frozen state Each of the test tubes 300 may include a test tube body 310 made of a transparent material such as glass and the like, a lower ring 330 coupled to a lower portion of the test tube body 310 and having a larger diameter than the test tube body 310, and an upper cover 320 coupled to an upper portion of the test tube body 310 to cover the test tube body 310 and having a larger diameter than the test tube body 310.

The upper cover 320 and the lower ring 330 are preferably made of the same material (i.e., polycarbonate) as the first housing 100.

When the test tubes 300 are accommodated into the first housing 100, the test tube body 310 do not come into contact with the central support ribs 120 or the side support ribs 130.

The lower ring 330 and the upper cover 320 having a larger diameter than the test tube body 310 are supported in a state in which the lower ring 330 and the upper cover 320 are fixed in contact with the side surfaces of the central support ribs 120 or the side support ribs 130.

The first housing 100 and the second housing 200 are coupled to each other to form an inner space, which is in a hexahedral structure, and bent surfaces 140 and 240 are formed at portions of corners of the first housing 100 and the second housing 200, respectively, to match the coupling direction as described above.

Figure 3:
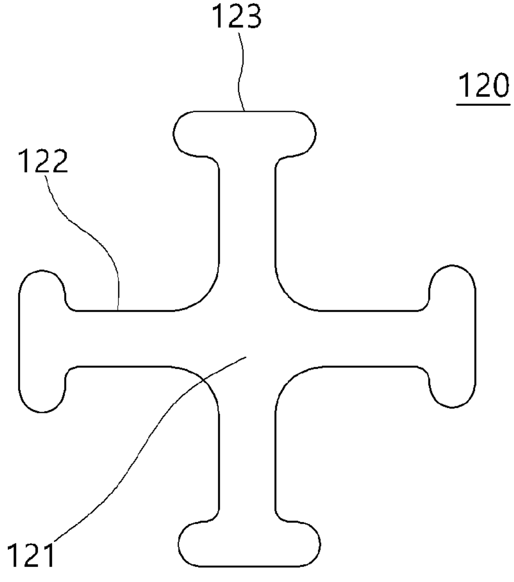
FIG. 3 is a top view of a central support rib.

FIG. 3 is a top view of a central support rib 120.

The central support rib 120 includes a central shaft portion 121, protrusions 122 protruding in all four directions so that the protrusions 122 are perpendicular to a side surface of the shaft portion 121, and contact portions 123 protruding from ends of the protrusions 122 in both directions perpendicular to a plane of the protrusions 122.

Since the protruding ends of the contact portions 123 come into contact with the upper cover 320 and the lower ring 330 of the test tube 300, the contact portions 123 support the test tube 300 to prevent the movement of the test tube 300.

The central support ribs 120 are integrally formed with the first housing 100, which is also made of the same polycarbonate material. Also, the central support ribs 120 may be injection-molded integrally with the first housing 100.

Figure 4:
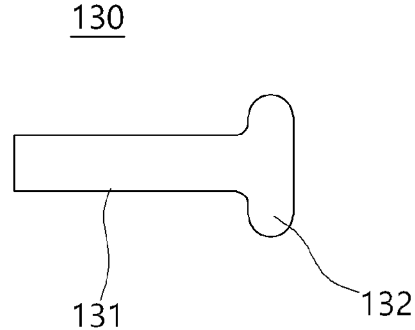
FIG. 4 is a top view of a side support rib.

FIG. 4 is a top view of the side support rib 130. Here, the side support rib 130 includes a protrusion 131 having one end fixed to an inner wall surface of the first housing 100 and protruding in a direction perpendicular to the inner wall surface or in a direction diagonal to each corner, that is, a direction at an angle of 45°, and a contact portion 132 protruding from a protruding end of the protrusion 131 in both directions perpendicular to the protrusion 131.

In this case, both of the protruding ends of the contact portion 132 may come into contact with portions of the side surfaces of the upper cover 320 and the lower ring 330 of two adjacent test tubes 300, respectively. In the case of the side support rib 130 protruding from the corner of the first housing 100, an outer surface of the contact portion 123 may come into contact with the upper cover 320 and the lower ring 330 of one test tube 300.

In the present invention, the first housing 100 is put into liquid nitrogen and frozen in a state in which the test tubes 300 are accommodated in the first housing 100. To facilitate the freezing of cells in the test tubes 300, a plurality of through holes capable of allowing liquid nitrogen to flow therethrough may be provided in the first housing 100 and the second housing 200.

A plurality of through holes 110 are provided in the bottom surface of the first housing 100, and may be divided into first bottom through holes 111 and second bottom through holes 11 depending on the positions of the through holes 110.

The first bottom through holes 111 are formed at the centers of locations at which the test tubes 300 of the first housing 100 are installed, and the second bottom through holes 112 are formed to expose regions between the installed test tubes 300.

This is to effectively introduce liquid nitrogen evenly throughout to uniformly freeze the cells in all the test tubes 300 regardless of the installation position.

The first bottom through holes 111 may be formed at the bottom center of the first housing 100 in a region formed by four central support ribs 120, formed at the bottom center of the first housing 100 in a region formed by two central support ribs 120 and two side support ribs 130, or formed at the bottom center of the first housing 100 in a region formed by one central support rib 120 and three side support ribs 130, depending on the formation position.

The second bottom through holes 112 are disposed at the centers between the first bottom through holes 111. The second bottom through holes 112 are disposed at the centers between the two facing contact portions 123 and 132.

The first top through holes 210 formed in the second housing 200 are disposed so that the first top through holes 210 are positioned above the through holes 110 of the first housing 100.

As described above, the arrangement of the first bottom through holes 111 and the second bottom through holes 112 of the first housing 100 and the arrangement of the first top through holes 210 of the second housing 200 are favorable to the flow of a fluid, which makes it possible to uniformly freeze the cells.

In this case, mechanical strength and fluid fluidity should be considered in the arrangement of the through holes 110 of the first housing 100 and the first top through holes 210 of the second housing 200. In the present invention, the size and arrangement of the through holes 110 of the first housing 100 and the first top through holes 210 of the second housing 200 are properly adjusted to provide a structure satisfying both mechanical strength and fluid fluidity.

The second housing 200 further includes second top through holes 220 and third top through holes 230 in addition to the first top through holes 210. Here, the second top through holes 220 are long holes formed in the top surface of the second housing 200 so that the long holes are formed adjacent to four edges, which form the top surface, in a direction in parallel with the four edges of the top surface.

Also, the third top through holes 230 are through holes formed by removing portions (i.e., edge portions) of the top surfaces and the side surfaces of the second housing 200 at positions spaced a predetermined distance from both ends of the second top through holes 220.

When the first housing 100 and the second housing 200 are coupled by such a structure, liquid nitrogen may be uniformly supplied into the coupled box.

The arrangement of through holes is strictly based on fluid analysis and is not based on the simple arrangement of through holes at the level of those skilled in the art.

This is because the design of the first housing 100 and the second housing 200 is made in consideration of the stress acting during freezing, as well as fluid analysis.

When a sample (i.e., cells) accommodated into the test tubes 300 is frozen according to the present invention, the stress by freezing is applied to the first housing 100 and the second housing 200.

That is, when the cells are frozen from room temperature (22° C.) at an atmospheric pressure of 1 atm to −196° C. at an atmospheric pressure of 1 atm (e.g., a cryogenic environment) according to the present invention, shrinkage stress is applied. In this case, the first housing 100 and the second housing 200 may be damaged by the shrinkage stress, which makes it impossible to safely accommodate the test tubes 300.

Figure 5:
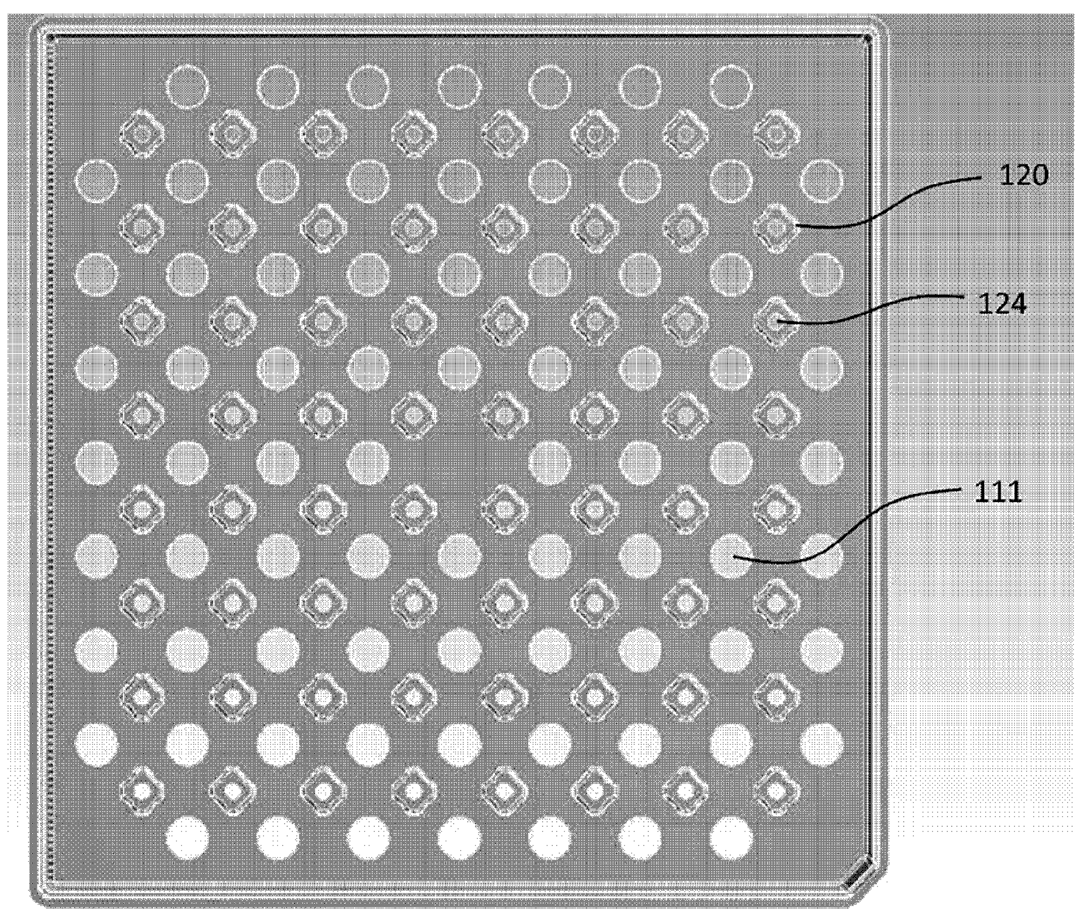
FIG. 5 is a top view of a first housing of a 9×9 cell cryopreservation device according to another embodiment of the present invention.

FIG. 5 is a top view of the first housing according to another embodiment of the present invention.

The embodiment of the present invention as described above has a 5×5 structure capable of accommodating 5 test tubes 300 in a transverse direction and 5 test tubes 300 in a longitudinal direction. FIG. 5 shows an example of a 9×9 structure capable of disposing 9 test tubes in a transverse direction and 9 test tubes in a longitudinal direction That is, the number of the test tubes 300 disposed in the first housing 100 may be adjusted when necessary, and the side support ribs 130 may be omitted when necessary.

Also, through holes 124 penetrating in a vertical direction are formed in the central support ribs 120. In this case, a structure capable of allowing a cooling gas to flow in the through holes 124 to reduce the temperature of the test tubes 300 may be provided.

Such through holes 124 may be applied to the 5×5 structure as described above, as well as structures in which a larger or smaller number of test tubes may be disposed.

In this case, through holes corresponding to the through holes 124 may also be formed in the second housing 200.

Table 1 below is a table of properties of polycarbonate, which is the material of the first housing 100 and second housing 200 according to the present invention.

TABLE 1

| property | dimension | value |
|---|---|---|
| density | kg/m3 | 1.2 |
| coefficient of thermal expansion | 1/c | |
| @22° C. | | 7e−05 |
| @−23° C. | | $5.468e^{-5}$ |
| @−273° C. | | $3.499e^{-5}$ |
| young's modulus | MPa | |
| @22° C. | | 9.9 |
| @−23° C. | | 19.8 |
| @−273° C. | | 58 |
| tensile yield strength | MPa | |
| @22° C. | | 54 |
| @−23° C. | | 75 |
| @−273° C. | | 180 |
| thermal conductivity | W/(m · c) | |
| @22° C. | | 0.22 |
| @−23° C. | | 0.18 |
| @−273° C. | | 0.108 |

To evaluate the performance of the present invention, thermal analysis, thermal-structural coupling analysis, and flow analysis were performed. The analytic objects and the analysis results are described, as follows.

In FIG. 13, model 1-1 has a 5×5 structure including only first bottom through holes 111 having a diameter of 6 mm, which are disposed below the test tubes 300, model 1-2 has a structure including first bottom through holes 111 and second bottom through holes 112, both of which have a diameter of 6 mm, as described above in the present invention, and models 1-3 and 1-4 have a 5×5 structure including first bottom through holes 111 having diameters of 12 mm and 15 mm, respectively.

FIG. 14 lists the analysis models of 9×9 models described above with reference to FIG. 5. The 9×9 models are named and described as "model 2," and divided into models having the through holes 124 and models having no first bottom through holes.

In describing the models, the sizes of the through hole in the bottom surface of a model were set to 1.5 mm, 3 mm, 6 mm, 12 mm, and 15 mm. Among them, the sizes of 12 mm and 15 mm, which are expected to cause mechanical damage under the influence of cryogenic environments, are preferentially excluded. Then, the size of 1.5 mm, which has no great advantage in terms of flow and flow rate, is also excluded.

Models 2-1 and 2-2 specify that the through holes 124 of each rib in a storage container have a diameter of 1.5 mm and 3 mm, and models 2-3 and 2-4 specify that the first bottom through holes 111 have a diameter of 3 mm and 6 mm and the through holes 124 have a diameter of 3 mm, respectively.

A. Thermal Analysis

Thermal analysis was performed on the models 1 and 2 as described above.

Mesh application is an analysis model, that is, a CAD model composed of nodes and elements. In this case, because each elements serve as a medium constituting an equation of the physical system to be analyzed, required elements should be set depending on the analysis environments.

In the present invention, a mesh is defined in a tetrahedron type, and a mesh density adjustment value is set to the densest phase of three phases so that mesh particles have an average size of 0.28 mm.

The numbers of nodes and elements for each model 1 are listed in Table 2 below.

TABLE 2

| model no. | nodes | elements |
|---|---|---|
| model 1-1 | 408,660 | 232,532 |
| model 1-2 | 401,150 | 226,848 |
| model 1-3 | 407,636 | 233,575 |
| model 1-4 | 414,045 | 237,864 |
| model 2-1 | | |
| model 2-2 | | |
| model 2-3 | | |
| model 2-4 | | |

The first housing 100 and the second housing 200 are combined into one rigid body through 3D modeling, and an external environment is initially set to 25° C., and then a convective condition (a film coefficient of 1.8 $W/m^{2}$° C.) is set.

Also, the temperature of the bottom surface of the first housing 100 was set to decrease from 25° C. to −196° C. within 4 hours.

The thermal analysis results obtained under such conditions are listed in FIG. 15.

Total heat flux refers to an amount of energy exchanged per unit area when a storage container reaches a steady state (−196° C.) equal to the temperature of a cryogenic storage tank. In the case of the 5×5 storage container (model 1), the total heat flux for each model was observed to have the maximum value at the bottom portion of the storage container, which first came into contact with liquid nitrogen or nitrogen vaporized from the liquid nitrogen regardless of the type of model. In the case of the 5×5 storage container, the maximum heat flux value was determined to be 7,1025 $W/m^2$ in the model 1-2 having the largest number of holes.

In the case of the 9×9 storage container (model 2), the maximum heat flux value was also calculated to be the highest (8,0721 $W/m^2$) in the model 2-2. Also, the maximum heat flux value appeared not to be associated with the total heat flux and the number and area of the holes disposed in the model. This means that the total heat flux is a flux at which the present invention reaches thermal equilibrium to a cryogenic temperature, but is not an indicator representing the degree of thermal equilibrium.

B. Thermal-Structural Coupling Analysis

Based on the thermal analysis results as described above, Thermal-structural coupling analysis was performed. Thermal-structural interaction analysis is for evaluating the stability of the present invention.

The temperature distribution and heat flux distribution results derived from the thermal analysis results were applied as loads. Based on the analysis results, the equivalent stress values for each model are listed in FIG. 16A-16B. When the maximum value of the equivalent stress applied to the present invention was lower than the tensile yield strength (i.e., compression yield strength) of the material, the through holes were considered to be safe under the loading conditions.

Stress occurs around the through hole due to the shrinkage of the material. In the case of the 5×5 model, there is a low probability of mechanical fracture under a cryogenic environment because the equivalent stress around the through holes is lower than the tensile yield strength of the material in models 1-1 to model 1-3.

On the other hand, because the equivalent stress around the through holes is 197 MPa in the case of model 1-4, the through holes were considered to be highly likely to be mechanically or physically damaged under the cryogenic environment in the liquid-type or vapor-type tank.

Meanwhile, in the case of the 9×9 model, because the equivalent stress formed around the through holes is lower than the tensile yield strength of the material in the models 2-1 to model 2-4, the through holes were considered to have no fractures in a gas-type tank as well as the liquid-type tank.

C. Flow Analysis

Setup of Modeling and Boundary Conditions

The present invention was analyzed using a commercial flow analysis program (ANSYS Fluent). The present invention was used for storage in a vapor-type tank as well as in the commercial liquid-type tank. Here, liquid nitrogen having a temperature of −194° C. is filled at the bottom of the vapor-type tank, and the vapor-type tank is maintained at −184° C. on average while circulating vaporized nitrogen gas through the inner part of the tank.

Liquid nitrogen is charged at a rate of 0.423 mm/hr as much as an amount of vaporized nitrogen gas. Based on this, when the flow rate of the vaporized nitrogen gas per hour is calculated, the flow rate of the vaporized nitrogen gas is 177,572.24 $mm^3$/hr.

The density of liquid nitrogen at −194° C. and 122 bar is 798.6 $kg/m^3$, but the density of gaseous nitrogen under the same conditions 5.494 $kg/m^3$, which indicates that the gaseous nitrogen expands approximately 145-fold.

Therefore, the volume of gaseous nitrogen allowed to flow and circulate in the vapor-type tank having a diameter of 731 mm is 25,805,106.27 $mm^3$/hr, and the flow rate of gaseous nitrogen is 0.017 mm/s. Also, the Reynolds number of gaseous nitrogen passing through the cryogenic storage container is 1.03, which indicates that the gaseous nitrogen has a laminar flow behavior in the vapor-type tank.

Therefore, a viscous laminar model was applied to model an internal volume of the present invention as a flow volume of gaseous nitrogen, and was constructed as a ¼ model. Among the through holes formed inside the storage container, the first bottom through holes 111, the second bottom through holes 112, or the through holes 124 disposed in the bottom of the first housing were set as inlets, and the top through holes formed in the second housing 200 were set as outlets.

In this case, the inlet boundary conditions were set so that gaseous nitrogen was allowed to flow at an inlet velocity of 0.017 mm/s at −180° C. in the present invention, and the outlet boundary condition was an outlet pressure (1 atm).

An inlet-outlet configuration set for each of the 5×5 and 9×9 models is as listed in FIG. 17. Because the results of flow analysis were also different from the analysis results depending on the number of meshes, the meshes were optimized using a mesh dependence test.

In the case of the 5×5 model, model 1-4 exceeding the tensile yield strength of the material was excluded from flow analysis review models based on the thermal-structural coupling analysis results as previously obtained above. In the case of the 9×9 model, the through holes 124 having a diameter of 1.5 mm and 3 mm were added to each of the models 2-3 and 2-4. The numbers of nodes and elements for each model are listed in Table 3.

TABLE 3

| model no. | nodes | elements | volume (mm^3) |
|---|---|---|---|
| model 1-1 | 1,318,300 | 6,866,477 | 189493.7 |
| model 1-2 | 1,319,657 | 6,872,075 | 190115.73 |
| model 1-3 | 1,316,682 | 6,858,711 | 190660.01 |
| model 2-1 | 1,836,210 | 9,909,533 | 188,210.31 |
| model 2-2 | 1,780,138 | 9,654,212 | 187,667.69 |
| model 2-3 | 1,840,532 | 9,928,817 | 188,600.87 |
| model 2-4 | 1,783,338 | 9,666,897 | 191,954.21 |

Flow Analysis Results

The outlet flow velocity of gaseous nitrogen flowing in the cell cryopreservation device of the present invention tended to be 2-fold higher in model 1 than in model 2. This is judged that this is because an area (a diameter) per one inlet hole is higher in model 1 than in model 2.

Because gaseous nitrogen is allowed to flow at $3.24\times10^{-3}$ mm/s or less in all regions other than the inlet and outlet regions in the models 1-1, 2-1, 2-2, 2-3, it is judged that there is little or no convective heat exchange due to the presence of gaseous nitrogen. In the models 1-2 and 1-3, the gaseous nitrogen is allowed to flow through a channel connecting the inlet region to the outlet region, but the gaseous nitrogen hardly flows in other regions other than the region connecting the inlet region to the outlet region, as described for the other models.

In the case of the model 2-4, the maximum flow velocity of gaseous nitrogen was 0.031 mm/s, which is the half the maximum flow velocity compared to the model 1-2 or 1-3. However, the flow of gaseous nitrogen tended to be observed in other regions other than the region connecting the inlet region to the outlet region, particularly at the upper parts (parts indicated by red dotted line) of the central support rib 120*s*.

Among the 5×5 models, the model 1-3 was considered to be most appropriate based on the flow analysis results. However, because the equivalent stress of the storage container is similar to the yield stress value of the material under a cryogenic environment, the model 1-2 was selected as the final model in consideration of the risk of mechanical or physical damage due to the cryogenic environment.

That is, in the 5×5 models, a structure including the first bottom through holes 111 and the second bottom through holes 112, both of which have a diameter of 6 mm, exhibits the most excellent properties.

In the case of the 9×9 models, the model 2-4 in which the gaseous nitrogen flows in most regions in the present invention was confirmed to be most appropriate.

That is, in the 9×9 models, a structure including the first bottom through holes 111 having a diameter of 3 to 6 mm and the through holes 124 having a diameter of 1.5 to 3 mm exhibits the most desirable properties.

Performance Evaluation

In the case of the 5×5 models, the model 1-2 having the first bottom through holes 111 and the second bottom through holes 112, both of which have a diameter of 6 mm, disposed therein was selected and manufactured as the cryogenic storage container for vapor-type tanks. In the case of the 9×9 models, the model 2-4 having the first bottom through holes 111 having a diameter of 6 mm and the through holes 124 having a diameter of 3 mm disposed therein was selected and manufactured as the cryogenic storage container for vapor-type tanks.

Figure 6:
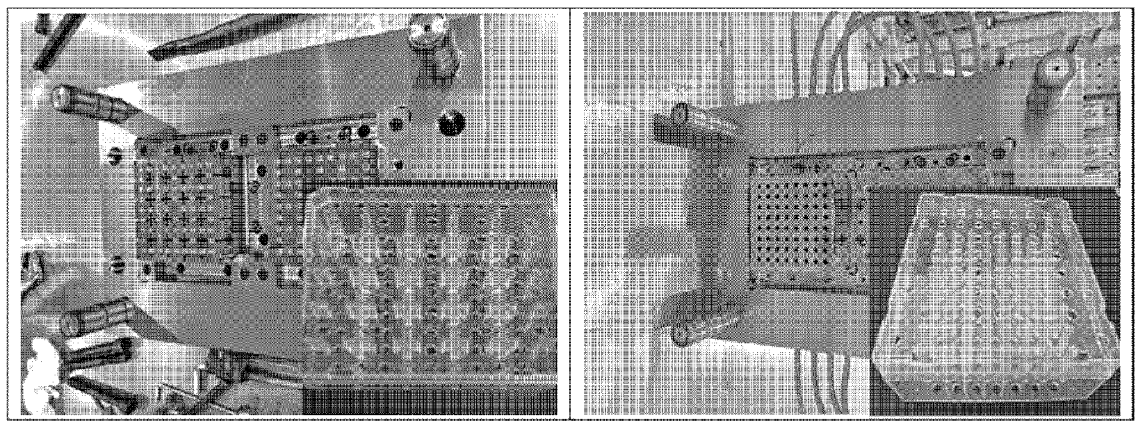
FIG. 6 is an image of a test product manufactured according to the present invention.

Images of the manufactured cryogenic storage containers are shown in FIG. 6.

A vial in which a temperature sensor is attached to each of test products in the models 1-2 and 2-4 was inserted into a vapor-type tank (MVE 800 series-190), and mounted on upper and lower portions of the tank. Then, a change in temperature was observed from room temperature to a temperature at which temperature equilibrium is reached. Also, a paper prototype was also tested.

As a result, in the case of the storage container mounted on the upper portion of the tank, the times taken to reach −80° C. were 8, 11, and 10 minutes for the 9×9 and 5×5 products and the paper prototype, respectively. On the other hand, the times taken to reach −130° C. appeared to be 14, 15, and 15 minutes for the 9×9 and 5×5 products and the paper prototype, respectively. Contrary to the expectations, the paper material prototype is more rapidly cooled, compared to the 5×5 product. This is because the two test products have a thickness of 32 mm, whereas the paper material prototype has a thin thickness of 2 mm or less, and holes are processed for products having no holes for the purpose of temperature measurement. Therefore, it is judged that the temperature drop is caused because gaseous nitrogen is allowed to rapidly flow in the paper material prototype compared to the 5×5 product, and an external temperature is also rapidly transferred by conduction. For the reasons as described above, in the case of the storage container mounted on the lower portion of the tank, the times taken to reach −80° C. were 5, 9, and 8 minutes for the 9×9 and 5×5 products and the paper prototype, respectively. On the other hand, the times taken to reach −130° C. were 8, 12, and 11 minutes for the 9×9 and 5×5 products and the paper prototype, respectively. The 9×9 product had a thickness of 32 mm as in the 5×5 product, but is rapidly cooled. In this case, this rapid temperature drop is considered because the 9×9 product reaches rapid temperature equilibrium by allowing the air to freely circulate into and out of the storage container while passing nitrogen gas having a cryogenic temperature through the through hole in the ribs.

Figure 7:
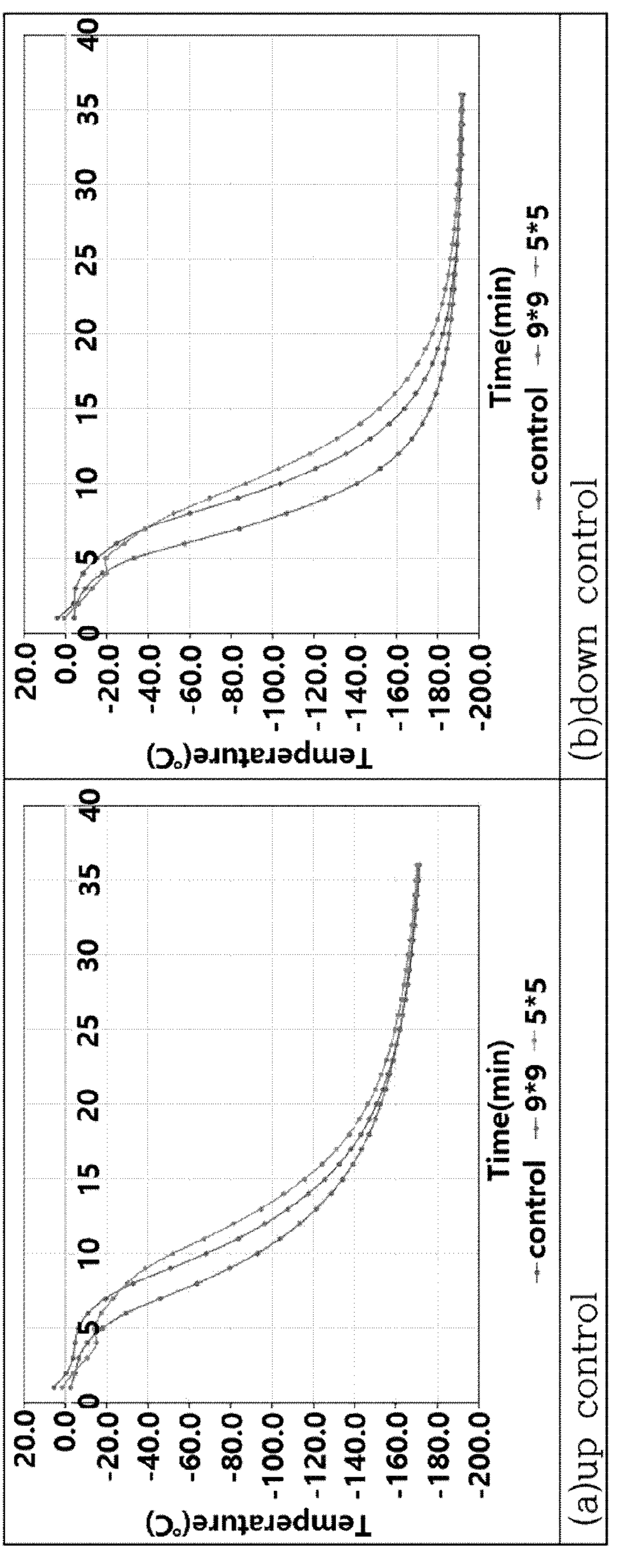
FIG. 7 is an experimental graph of the time taken to reach temperature phase equilibrium according to the present invention.

These results may be confirmed in the graph shown in FIG. 7. In FIG. 7, the control represents a paper material prototype.

Hereinafter, the fluid analysis results will be described in further detail.

Figure 8:
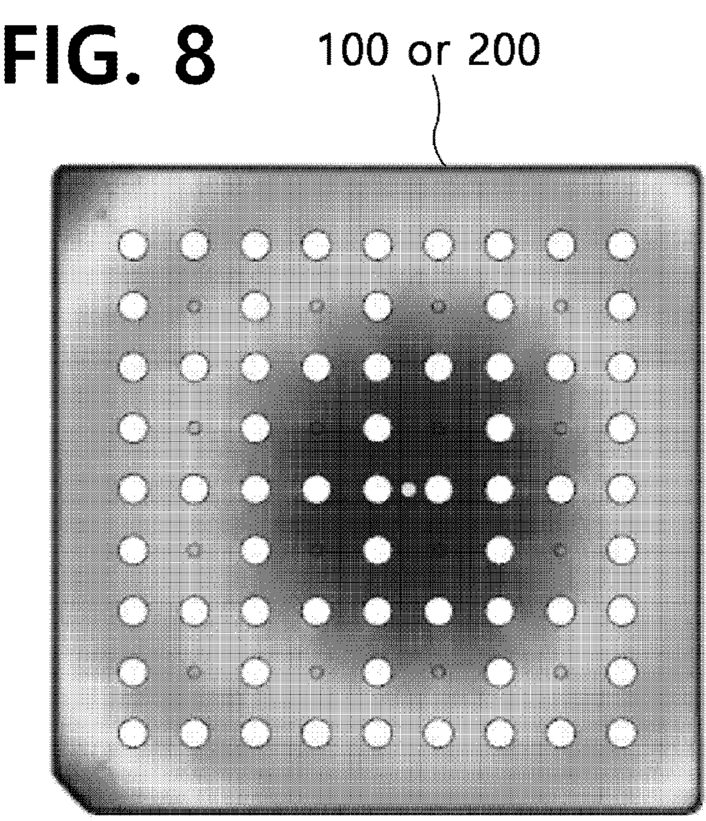
FIG. 8 is a diagram showing the results of fluid analysis according to the present invention.

FIG. 8 shows the fluid analysis results according to the present invention.

The fluid analysis results of FIG. 8 are identical to the fluid analysis results of the first housing 100, and the fluid analysis results of the second housing 200 may also be expressed in the same fashion.

The cooling with a very uniform temperature distribution is possible depending on the arrangement of the first bottom through holes 111 and the second bottom through holes 112 of the first housing 100, and the arrangement of the first top through holes 210, the second top through holes 220 and the third top through holes 230 of the second housing 200.

Also, the arrangement of the first bottom through holes 111 and the second bottom through holes 112 of the first housing 100 and the arrangement of the first top through holes 210, the second top through holes 220 and the third top through holes 230 of the second housing 200 are configured to relieve the stress caused by cooling. In particular, through holes 111, 112, 210, 220, and 230 having a diameter of 6 mm are used.

The total number of through holes 110 of the first housing 100 is 65, and the area of the through holes 110 is 1836.9 $mm^2$.

Because there is a difference in stress acting on the through holes depending on the diameter of the through holes, these are the optimum diameter and number of through holes capable of facilitating the flow of a fluid and simultaneously preventing damage to the first housing 100 and the second housing 200 due to stress.

That is, mechanical fracture does not occur when the stress is applied within a range of the maximum tensile yield strength of the first housing 100 and the second housing 200, but mechanical fracture may occur due to the influence of the cryogenic environment around the through holes when the stress is out of the maximum tensile yield strength range.

Figure 9:
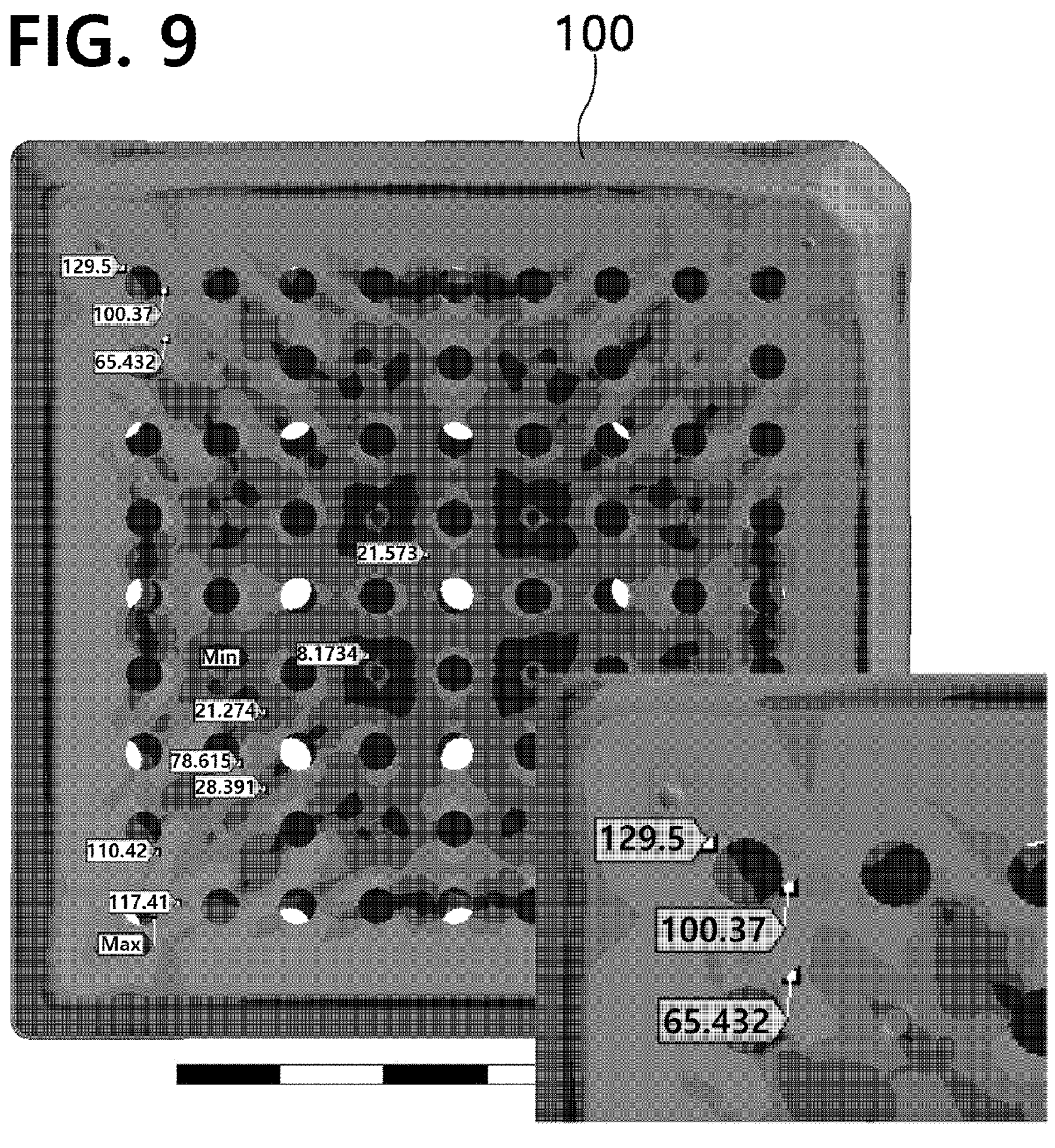
FIG. 9 is a diagram showing the stress analysis of the first housing.

FIG. 9 shows the stress test results of the first housing 100 in which the through holes have a diameter of 6 mm.

Accordingly, as shown here, the maximum stress acts at the junction of the first housing 100 and the second housing 200, and is lower than the maximum tensile yield strength of the first housing 100 and the second housing 200, both of which are made of PC. Also, because the stress acting on the surroundings of the through holes is also lower than the maximum tensile yield strength of PC, mechanical or physical fracture does not occur.

Figure 10:
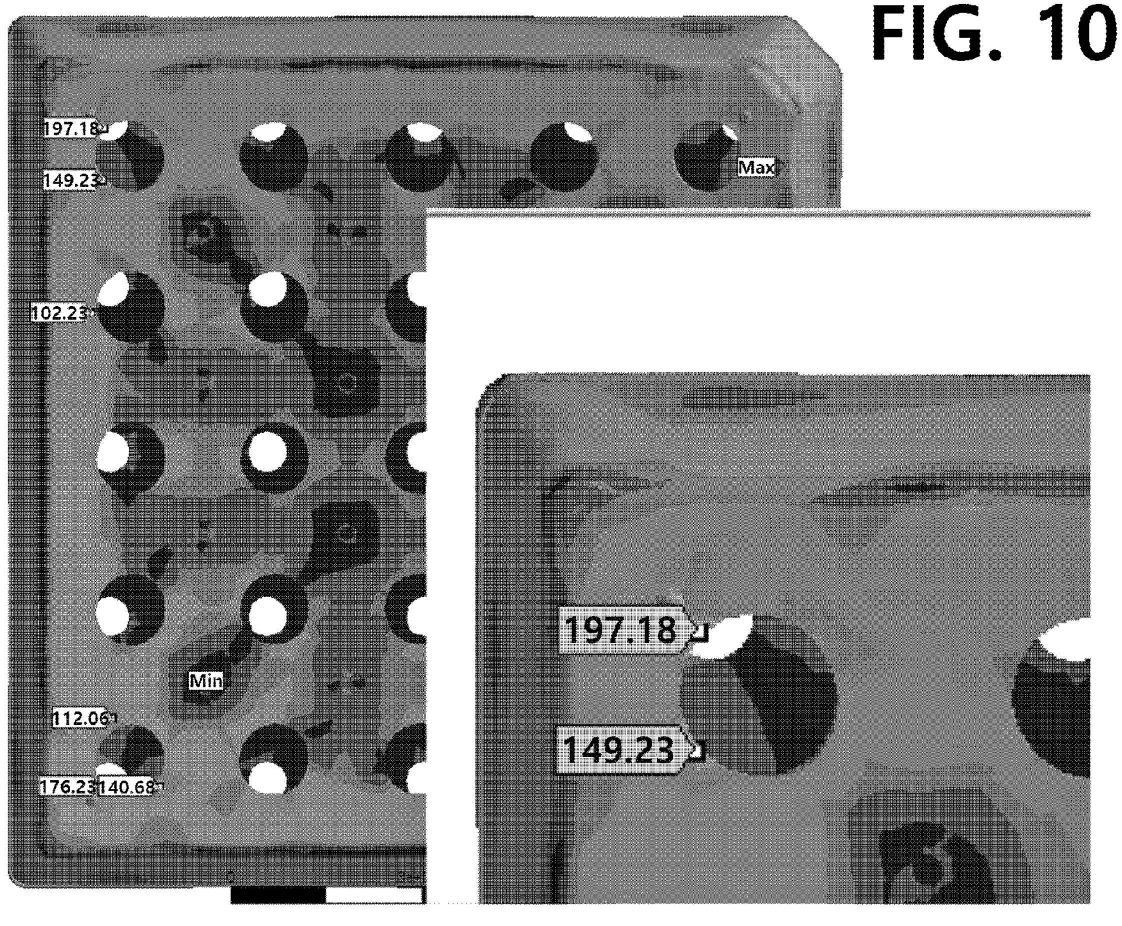
FIG. 10 is a diagram showing the stress analysis of a first housing with different through hole sizes.

However, as shown in FIG. 10, when the diameter of the through holes is set to 12 mm, the stress around the through holes increases, and falls out of the range of the maximum tensile yield strength of PC, thereby increasing the risk of fracture when the surroundings of the through holes are kept under the cryogenic environment.

Therefore, the diameters of the through holes 110 of the first housing 100 and the first top through holes 210 of the second housing 200 applied to the present invention are both in a range of 3 to 6 mm. When the diameter is less than 3 mm, there is a problem with fluid flow. When the diameter is greater than 6 mm, the risk of fracture may increase with an increase in stress.

In this way, the present invention suggests an arrangement and size of the through holes that allow uniform cooling as a whole without causing any mechanical or physical fracture or deformation even during rapid cooling.

Evaluation of Performance of the Present Invention Through Cell Culture

To evaluate the performance of the present invention, one group of vial tubes containing cells in a paper material prototype and 9×9 and 5×5 models was stored for one cell line (C2C12) and one type of human adult stem cells (human adipose tissue-derived mesenchymal stem cell (hADMSCs) P8) for 24 hours in a deep freezer maintained at −80° C., and then thawed at room temperature. Another group was frozen for 48 hours in a gas-type tank maintained at −196° C.

For both groups, the viability of the cells contained in each vial tube was evaluated after the cells were thawed at room temperature, and the adhesion rates after 6 hours and the relative cell proliferation rates after 1/3/5 days were compared.

A cell cryopreservation solution in which media, FBS, and DMSO were mixed at a ratio of 7:2:1 was used, and the number of C2C12 and hADMSC cells was set to the same level of $1\times10^6$ cells/mL, and the cells were frozen and thawed. Then, the cells were inoculated in a 60 mm culture vessel at a density of $4\times10^4$ cells/mL.

To evaluate the viability and adhesion rate, the cells were counted using an LUNA-FL™ Dual Fluorescence Cell Counter (Logos Biosystems). To evaluate the proliferation rate, the frozen and thawed C2C12 cells were cultured in DMEM High glucose (Themo Fisher Scientific)+10% FBS (Hyclone)+1% P/S (Themo Fisher Scientific), and hADMSC P8 was cultured in CEFOgro™ MSCGM. Then, the cells were analyzed using a 3-(4,5-dimethylthiazol-2-yl)-5-(3-carboxymethoxyphenyl)-2-(4-sulfophenyl)-2H-tetrazolium (MTS) reagent (Sigma, MO, USA).

Based on the cell culture results, it was confirmed that C2C12 exhibited higher cell proliferation sensitivity to a change in temperature compared to hADMSC P8. Similar to the results of temperature measurements according to the present invention, when the cells were stored at −80° C. and −196° C., thawed, and proliferated, the cell proliferative indexes (viability, adhesion rate, and proliferation rate) of the 5×5 product appeared to be similar to or slightly lower than those of the paper material prototype. Because the paper material prototype had a thin thickness of 2 mm, this appeared to be due to rapid temperature transfer through the material although there was an effect on the flow and flow rate. Because the 5×5 and 9×9 products had a thickness of 32 mm, the 5×5 and 9×9 products were more affected by the temperature equilibrium by the flow and flow rate through the through tubes rather than the temperature transfer through a surface of the material, compared to the paper material prototype. Therefore, the through tubes disposed on the bottom surface of the cryopreservation container and the through tubes in the rib structures installed in a column type appeared to enhance the storage stability of the cells by facilitating the flow of air more freely. In all the storage containers developed to adjust the flow and flow rate more easily, the proliferation rate was improved by up to 130%, compared to the paper material prototype. When the cells in the storage container were stored for a long period of one month or more and then thawed in the vapor-type tank in the future, the storage containers were judged to have better cell proliferative indexes than the conventional products in which the number of through tubes was minimized to prevent mechanical fracture. On the other hand, among the three types of cryogenic storage containers, the cell proliferative indexes for the C2C12 cell line in the 9×9 product whose inner temperature dropped most rapidly were at the highest level regardless of temperature. In particular, the adhesion rate was greater than or equal to approximately 90%, which may meet the requirements for storage and transportation of the US FDA-approved cell-based therapeutic agents.

Only when the hADMSC P8 cells were stored at −80° C. and proliferated in a similar fashion, the cell viability was lowest in the 5×5 product. When the hADMSC P8 cells were proliferated under the other temperature conditions, the 5×5 and 9×9 products exhibited higher cell proliferative indexes compared to the paper material prototype. In particular, the 9×9 product generally had a viability of 90% or more and an adhesion rate of 80% or more after 6-hour culturing, compared to the paper material prototype and the 5×5 product. Therefore, it was confirmed that the 9×9 product exhibited the best performance.

Figure 11:
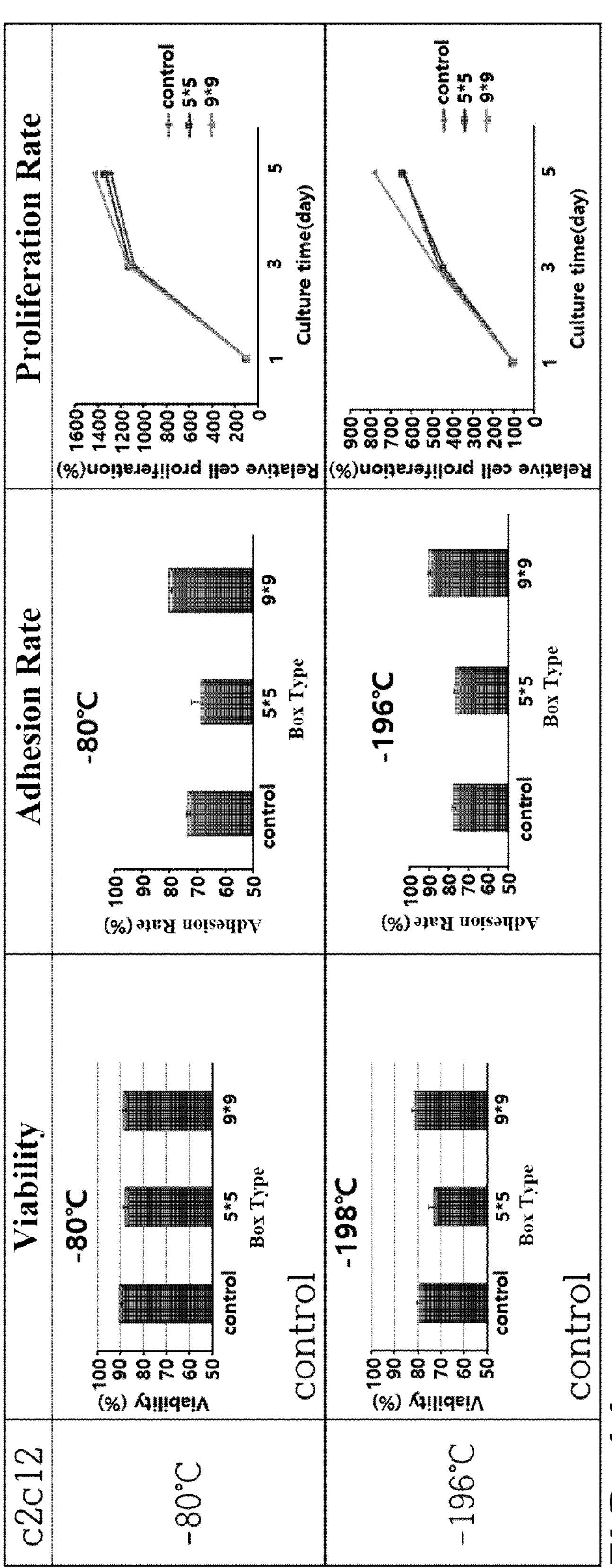
FIGS. 11 and 12 are diagrams showing the performance test results according to the present invention.
Figure 12:
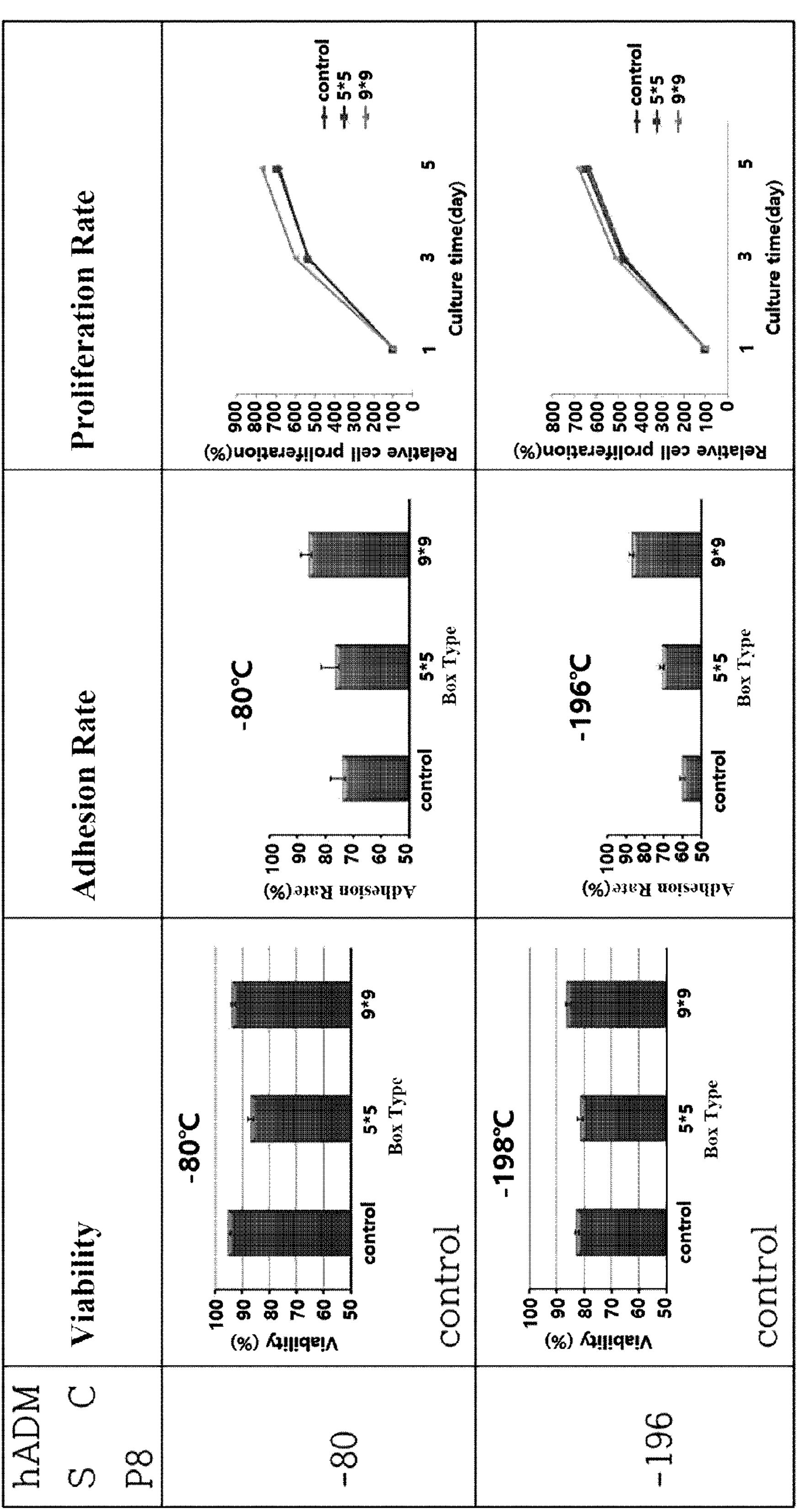

These test results are shown in FIGS. 11 and 12, respectively.

Accordingly, the present invention may provide a cell cryopreservation device capable of being applied to the vapor-type tank without causing any fracture even under a cryogenic environment, and thus is expected to be favorable for the storage of cells for regenerative medicine as the storage stability of the cells is enhanced.

It is apparent to those skilled in the art to which the present invention pertains that various modifications and variations can be made to the present invention by a person having ordinary skill in the art without departing from the scope of the present invention. Therefore, the scope of the present invention is not defined by the foregoing embodiments, but rather defined by the appended claims of the present invention.

INDUSTRIAL APPLICABILITY

The present invention relates to a structure of a device capable of rapidly reaching thermodynamic temperature equilibrium while enhancing mechanical strength, and thus is industrially applicable.

The invention claimed is:

1. A cell cryopreservation device comprising:

a first housing for accommodating a plurality of test tubes;

a second housing for covering the first housing;

central support ribs extending upward from an inner bottom surface of the first housing to support the periphery of the test tubes while coming in contact with side surfaces of the test tubes;

first bottom through holes formed in the centers of locations at which the test tubes are accommodated on a bottom surface of the first housing; and through holes vertically passing though the centers of the central support ribs.

2. The cell cryopreservation device of claim 1, further comprising second bottom through holes disposed between the first bottom through holes.

3. The cell cryopreservation device of claim 2, further comprising side support ribs extending from an inner wall surface of the first housing toward the inner side of the first housing to support the test tubes while coming in contact with the side surfaces of the test tubes.

4. The cell cryopreservation device of claim 3, wherein each of the side support ribs comprises:

a protrusion having one end fixed to an inner wall surface of the first housing and protruding in a direction perpendicular to the inner wall surface or in a direction diagonal to each corner, that is, a direction at an angle of 45° relative to its corresponding corner; and a contact portion protruding from a protruding end of the protrusion in two directions perpendicular to the protrusion.

5. The cell cryopreservation device of claim 2, wherein the first bottom through holes and the second bottom through holes have a diameter of 3 to 6 mm.

6. The cell cryopreservation device of claim 1, wherein the through holes vertically passing through the centers of the central support ribs have a diameter of 1.5 to 3 mm.

7. The cell cryopreservation device of claim 1, wherein each of the central support ribs comprises:

a shaft portion extending upward from the bottom surface of the first housing;

protrusions protruding in all four directions to be perpendicular to the side surface of the shaft portion; and contact portions protruding from ends of the protrusions in both directions perpendicular to a plane of the protrusions.

8. The cell cryopreservation device of claim 3, wherein the test tubes are fixed in a state in which the side surfaces of upper and lower portions of the test tubes come into contact with the central support ribs or the side support ribs.

9. The cell cryopreservation device of claim 8, wherein each of the test tubes comprises:

a test tube body made of a transparent material;

a lower ring fitted onto a lower portion of the test tube body and having a larger diameter than the test tube body; and an upper cover coupled to an upper portion of the test tube body and having a larger diameter than the test tube body.

10. The cell cryopreservation device of claim 2, wherein the second housing has first top through holes formed in a top surface thereof, and the first top through holes are disposed above the first and second bottom through holes of the first housing.

11. The cell cryopreservation device of claim 10, wherein the first top through holes have a diameter of 3 to 6 mm.

12. A cell cryopreservation device comprising:

a first housing for accommodating a plurality of test tubes;

a second housing for covering the first housing;

central support ribs extending upward from an inner bottom surface of the first housing to support the periphery of the test tubes while coming in contact with side surfaces of the test tubes;

first bottom through holes formed in the centers of locations at which the test tubes are accommodated on a bottom surface of the first housing;

through holes vertically passing though the centers of the central support ribs, wherein the second housing comprises first top through holes formed in a top surface thereof, and second top through holes formed in parallel with each of four edges of the top surface of the second housing at a position adjacent to each edge.

13. The cell cryopreservation device of claim 12, wherein the second housing further comprises a pair of third top through holes disposed in pairs with each of the second top through holes being interposed therebetween, wherein the third top through holes are positioned to reach portions of the top and side surfaces of the second housing.

* * * * *